(12) United States Patent
DeJesus et al.

(10) Patent No.: US 9,731,441 B2
(45) Date of Patent: Aug. 15, 2017

(54) DOUBLE FABRIC FACED INJECTION MOLDED FIXTURE

(71) Applicant: MGNT Products Group, LLC, Charlotte, NC (US)

(72) Inventors: William M. DeJesus, Charlotte, NC (US); Peter Nielsen, Purcellville, VA (US); Larry Meyers, Layton, UT (US)

(73) Assignee: MGNT Products Group, LLC, Charlotte, NC (US)

( * ) Notice: Subject to any disclaimer, the term of this patent is extended or adjusted under 35 U.S.C. 154(b) by 910 days.

(21) Appl. No.: 13/934,304

(22) Filed: Jul. 3, 2013

(65) Prior Publication Data

US 2014/0319833 A1      Oct. 30, 2014

Related U.S. Application Data

(60) Provisional application No. 61/816,334, filed on Apr. 26, 2013.

(51) Int. Cl.
*F16L 23/12* (2006.01)
*B29C 45/00* (2006.01)
(Continued)

(52) U.S. Cl.
CPC .... *B29C 45/0046* (2013.01); *B29C 45/14065* (2013.01); *B29C 45/14508* (2013.01); *B29C 45/14631* (2013.01); *F16L 23/003* (2013.01); *F16L 23/12* (2013.01); *B29C 2045/14147* (2013.01); *B29C 2045/14532* (2013.01); *B29K 2101/12* (2013.01); *B29K 2713/00* (2013.01); *Y10T 29/49826* (2015.01)

(58) Field of Classification Search
CPC ................................ F16L 23/12; F16L 23/003
USPC .................................................. 285/56; 4/613
See application file for complete search history.

(56) References Cited

U.S. PATENT DOCUMENTS 4,551,870 A    11/1985 Presti, Jr.
4,590,731 A    5/1986 DeGooyer
(Continued)

FOREIGN PATENT DOCUMENTS

CA         2689796        7/2010
DE         10131338 A1    9/2002
(Continued)

OTHER PUBLICATIONS

International Search Report of PCT/US2014/035254 mailed Aug. 5, 2014.
(Continued)

*Primary Examiner* — David E Bochna
(74) *Attorney, Agent, or Firm* — Nelson Mullins Riley & Scarborough LLP

(57) ABSTRACT

A flanged plumbing fixture having two planar fabric mortar-bondable face layers fused to opposite sides of a planar plastic core layer is made by aligning two preformed fabrics on top of each other, with connecting elements positioned between the fabrics and bonded to each of the two fabrics, positioning the connected two fabrics in a mold and centering the connected fabrics inside the mold by the connecting elements, injecting a plastic material through openings in the connecting elements, and filling the space between the two fabrics with the plastic material.

5 Claims, 19 Drawing Sheets

(51) Int. Cl.
*F16L 23/00* (2006.01)
*B29C 45/14* (2006.01)
*B29K 101/12* (2006.01)

(56) References Cited

U.S. PATENT DOCUMENTS

| | | |
|---|---|---|
| 5,095,667 A | 3/1992 | Ryan |
| 7,410,608 B1 | 8/2008 | Gohlke |
| 7,992,236 B2 | 8/2011 | DeGooyer |
| 8,060,956 B2 | 11/2011 | DeGooyer |
| 8,112,827 B2 | 2/2012 | DeGooyer et al. |
| 2004/0156937 A1 | 8/2004 | Park et al. |
| 2005/0017384 A1 | 1/2005 | Tamai |
| 2009/0113621 A1 | 5/2009 | DeGooyer et al. |
| 2010/0170035 A1* | 7/2010 | Kik, Sr. .......... A47K 3/40 4/613 |
| 2011/0308008 A1 | 12/2011 | DeGooyer |
| 2013/0160203 A1 | 6/2013 | DeGooyer et al. |
| 2014/0317841 A1 | 10/2014 | DeJesus |
| 2014/0319833 A1 | 10/2014 | DeJesus |

FOREIGN PATENT DOCUMENTS

| | | |
|---|---|---|
| DE | 102004025571 A1 | 12/2005 |
| DE | 102005020200 A1 | 11/2006 |
| DE | 202006014440 U1 | 2/2007 |
| DE | 202006019814 | 5/2007 |
| DE | 202008011354 U1 | 2/2010 |
| DE | 102011018518 | 9/2012 |
| EP | 0481938 | 4/1992 |
| EP | 0860559 | 8/1998 |
| EP | 1296000 | 3/2003 |
| EP | 1540872 | 2/2005 |
| EP | 1743756 | 1/2007 |
| EP | 2177677 | 4/2010 |
| EP | 2206456 | 7/2010 |
| EP | 2248957 A1 | 11/2010 |
| EP | 2466023 A1 | 6/2012 |
| GB | 1451824 | 10/1976 |
| JP | 6025719 | 2/1985 |
| JP | 2007016520 | 1/2007 |
| JP | 2007160942 A | 6/2007 |
| NL | 1026249 C2 | 11/2005 |
| WO | 2014176399 | 10/2014 |
| WO | 2014176402 | 10/2014 |

OTHER PUBLICATIONS

International Search Report of PCT/US2014/035249 mailed Dec. 16, 2014.
Copending U.S. Appl. No. 13/934,284 for Integrated Bonding Flange Support Disk for Prefabricated Shower Tray filed Jul. 3, 2013.
Schluter-Shower System Installation Handbook 2012-2013; Dec. 2012; 40 pgs.
Office Action and Search Report from corresponding Chinese Application No. 201480033121.4; all enclosed pages cited.

\* cited by examiner

DOUBLE FABRIC FACED INJECTION MOLDED FIXTURE

RELATED APPLICATIONS

This application is related to application Ser. No. 13/934,284, filed concurrently herewith for "Integrated Bonding Flange Support Disk for Prefabricated Shower Tray" granted on Apr. 12, 2016, as U.S. Pat. No. 9,307,869.

BACKGROUND

The present invention relates to the construction of waterproof systems in the mortar-bonded environment. Such environments typically include tiled floors and walls and associated fixtures and drains (e.g., in showers).

Conventional methods of installing ceramic tile shower floors have typically included several steps. First, a sloped mortar bed is installed that slopes from an edge (e.g., a wall, a curb, or some other border) to the position of a drain in a subfloor. This mortar bed is typically referred to as sloped fill, or "pre-slope". A waterproof barrier, commonly referred to as a shower pan liner, is subsequently positioned over the sloped mortar bed and fixed to the drain. Conventional shower pan liners are not designed to bond to a substrate or to ceramic or stone tile and thus a second non-bonded ("floating") mortar bed must be overlaid to provide a load distribution layer and bonding surface for the tile. To have sufficient strength and mass, such non-bonded mortar beds for shower floors should have a minimum thickness of at least about 1.50-inches and should be reinforced with galvanized wire mesh to comply with industry standard guidelines. This method of shower floor construction has proven over time to be reliable when properly built, but requires a high degree of trade knowledge and skill and takes considerable time to construct.

More recently, changing consumer preferences, designer influences, and in some cases the unavailability of craftsmen skilled in these techniques have driven changes in consumer preferences, and in the manner in which such showers (or equivalent structures) are constructed. In particular, the trends point toward simplified shower installation methods and systems.

To facilitate these trends, integrated systems have recently been developed that use lighter materials, and that can be installed using quicker, simplified methods. Much of this progress has been made possible with the advent of a new generation of materials that allow each layer to be bonded to the previous. Many of these materials that have been developed in recent years have incorporated fabric faces which are integrally molded onto component faces. In particular, because the relevant mortar materials mechanically lock to the open three dimensional structure of the fabric face, the fabric faces enable waterproofing membranes, drains and other components to be mortar bondable. In some cases these systems are formed of a prefabricated shower tray (typically formed of polymer foam) which is mortar bonded to the subfloor. In some typical systems, a waterproofing membrane, referred to as a load bearing, bonded waterproof membrane, is fixed to the foam tray with thin set mortar. The tile is then bonded over the membrane, again using thin set mortar. Thus, a typical integrated system could include (in order) substrate/initial mortar layer/shower tray/second mortar layer/membrane/third mortar layer/tile.

As a further convenience, a pre-manufactured flanged drain fixture can be positioned on the mortar on the tray to provide a structural location for the drain grate, to provide ample surface adhesion for the waterproofing membrane, and to connect the drain to the remainder of the plumbing. In many circumstances, the flanged drain fixture is formed to include a circular, square or rectangular flange with the drain opening in the desired location (typically the center). This flange is typically pressed against the thin set mortar on the tray and provides the necessary surface for adhering and bonding the waterproofing membrane. The flange also helps provide structural support for the final drain fixture and its grate. In a typical construction, after the flanged drain fixture is positioned on the foam tray (and mortar), another layer of thin set mortar is applied over the entire surface, following which a load bearing, bonded waterproof membrane is added. The final tile surface is added over the membrane, again using thin set mortar.

In order to provide adequate adhesion and form a water tight seal between the membrane, thin set mortar, and the flanged drain assembly, the top surface of the drain assembly has typically included an incorporated fabric layer. For a number of reasons, including conventional manufacturing techniques, the bottom of the flanged drain fixture, which likewise must be set with thin set mortar, has not included such an integrated fabric face. As a result, such drain flanges lack an adequate bonding surface between the bottom of the drain flange and to the thin set mortar that supports the drain flange assembly. Providing and maintaining support beneath the drain is nevertheless quite important because the drain area tends to experience much of the loading forces in this type of structure.

Accordingly, a need exists for a drain flange fixture that includes an integrated fabric on all surfaces (typically upper and lower) that receive or contact thin set mortar.

SUMMARY

In one aspect the method of the invention includes the steps of aligning two preformed fabrics on top of each other, with connecting elements positioned between the fabrics and bonded to each of the two fabrics, positioning the connected two fabrics in a mold and centering the connected fabrics inside the mold by means of the connecting elements, injecting a plastic material through openings in the connecting elements, and filling the space between the two fabrics with the plastic material.

In another aspect the invention is a method of forming a double fabric faced injection molded fixture. The method includes the steps of superimposing a first temperature resistant fabric on a rigid temperature resistant fixture plate, positioning a temperature resistant spacer on the first fabric opposite the fixture plate, placing an alignment pin in the spacer on the fabric overlying the fixture plate, superimposing a second fabric over the first fabric and spaced from the first fabric by the spacer while aligning the second fabric on the alignment pin, removing the alignment pins and adding a melted thermoplastic or thermosetting resin into the spacer, and through the spacer and between the fabrics while the fabrics and plate are clamped in a mold.

In another aspect the invention is a double fabric faced plumbing fixture. The fixture includes two planar fabric layers separated by a planar thermoplastic or thermoset core layer with each planar fabric layer fused to the plastic core layer.

In another aspect the invention is a spacer for injection molding. The spacer includes a support plate, a plurality of spacing uprights on the support plate for defining the spacing characteristics of the spacer, and with the spacing uprights defining an injection opening there between, and a pin cylinder depending from the support plate opposite the spacing uprights.

DETAILED DESCRIPTION

Figure 1:
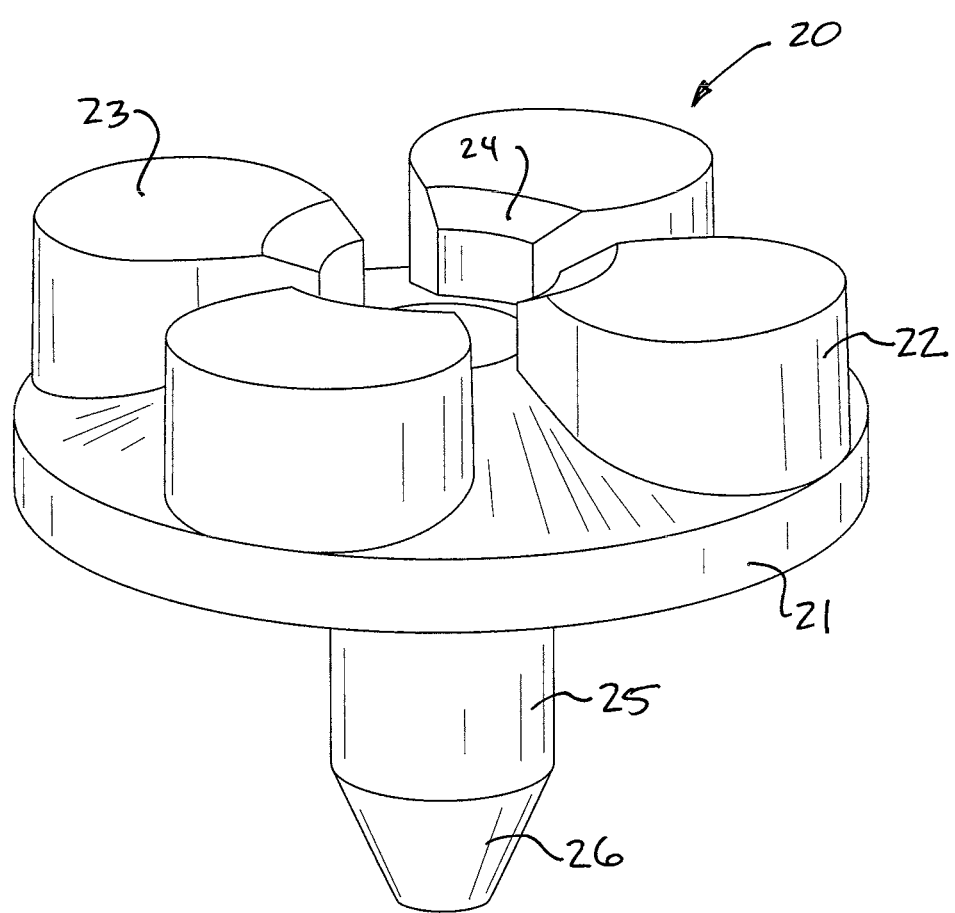
FIG. 1 is a perspective view of a gate button spacer according to the invention.

FIG. 1 is a perspective view of a gate button spacer or connecting element 20 according to the present invention. In order to accommodate the method of the invention as described herein, the gate button spacer is formed of a material that will withstand the temperature required for the injection molding step. In representative embodiments, the gate button spacer is molded from a thermoplastic or thermosetting resin that has a higher melting point than the melting point of the plastic injected to make the entire flange. The resin for the spacer can be any polymer resin that can withstand the structural stress of the mold and the temperature of the injection molded plastic for the flange. The selection is well understood by the skilled person, but (for example) thermoplastics with relatively high melting points can include fluoropolymers, liquid crystal polymers, polyamide, polyimide, polyarylate, polyether keytone, polyether imide and polysulfones.

Figure 10:
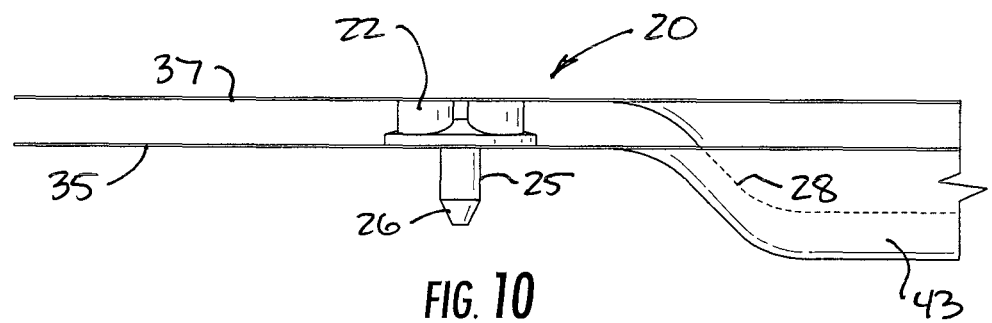
FIG. 10 is a cross-sectional view corresponding to FIG. 9.

In detail, the illustrated button spacer concludes a support disk 21 which carries a plurality (four are illustrated) of spacing cylinders 22 on its upper side. The spacing cylinders 22 each have an upper cylinder surface 23 and an inclined edge 24. As illustrated in FIG. 10, the height of the spacing cylinders 22 defines the thickness of the eventual flange, and thus can be selected or designed for that purpose.

Figure 11:
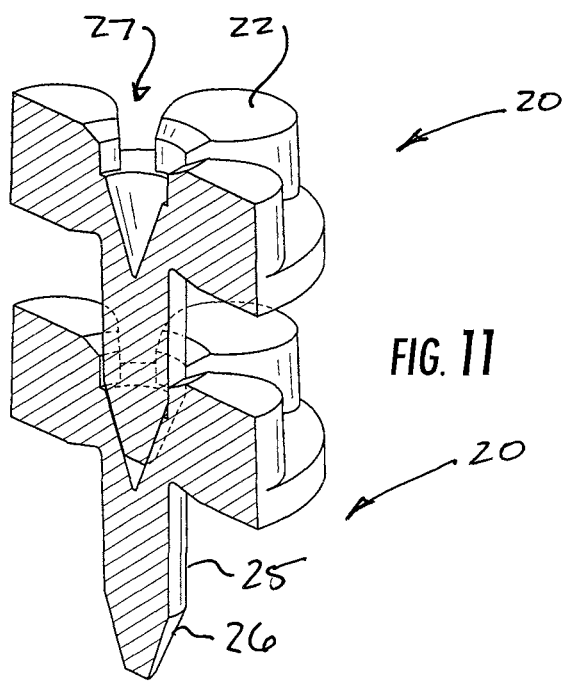
FIG. 11 is a partial perspective, partial cross-sectional view of stacked gate spacer buttons.
Figure 12:
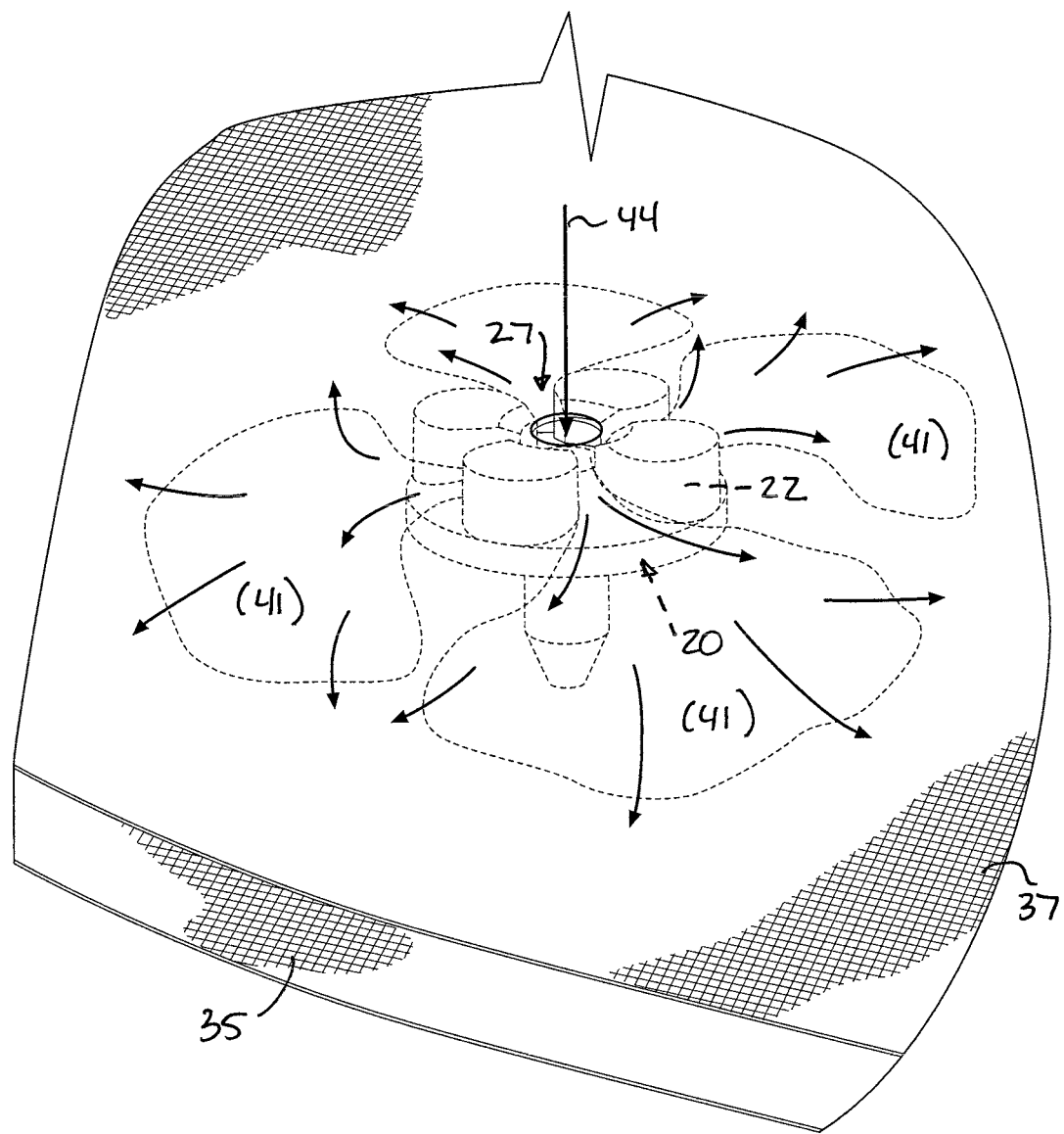
FIG. 12 is a partial perspective view of the top and bottom face fabrics, a gate spacer, and an injected plastic.

A pin 25 depends from the support disk 21 and terminates in a pin frustum 26. The frustum 26 eases the alignment of the gate button spacer with the alignment openings (FIG. 4) and helps make the spacers stackable (FIG. 11). The geometry and positions of the spacing cylinders 22 define an injection opening 27 centered in the support disk 21 and that permits the melted resin to be added (FIG. 12).

In some embodiments the pin 25 is cylindrical and in other embodiments the pin 25 has a square cross section. When a square cross section is used, the gate button spacer can be more easily oriented (or "clocked") to position the spacing cylinders 22 in a predetermined position. This in turn fixes the flow path of the melted resin as it is injected between the spacing cylinders (e.g., FIG. 12).

Figure 2:
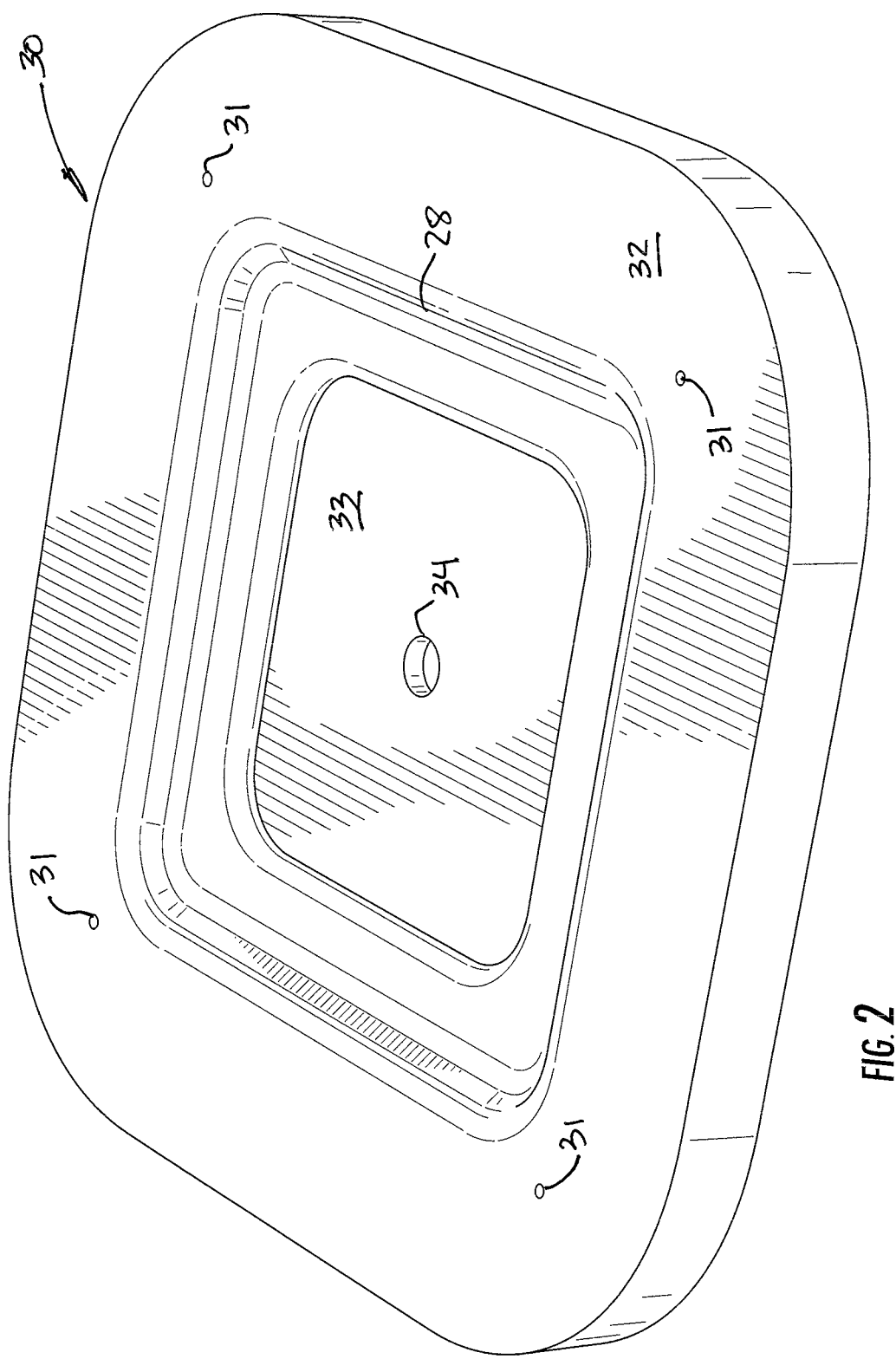
FIG. 2 is a perspective view of the aluminum fixture plate used in the method of the invention.

FIG. 2 illustrates an embodiment of a fixture plate broadly designated at 30. As illustrated, the plate is generally square with rounded corners, but it will be understood that the purpose of the plate is to define the eventual molded fixture. Thus, a different shape fixture plate can be used to produce a different shape of flange and the invention (method or structure) is not limited to the illustrated embodiments. The plate 30 is typically formed of aluminum, although any material that has the necessary structural strength, can be formed into the desired shape, and can withstand molding temperatures, will be appropriate.

The plate 30 includes a plurality of corner positioning holes 31 four of which are shown in the illustrated embodiment. The corner positioning holes 31 receive the gate spacer buttons 20 (FIG. 4).

The plate 30 includes an incline 28 leading to a lower top surface 33 from the upper top surface 32. The lower top surface 33 includes a tooling opening 34 illustrated in the center of the lower top surface 33 and in the center of the overall plate 30. This position is exemplary rather than limiting, however, as is the circular shape of the tooling opening.

Figure 3:
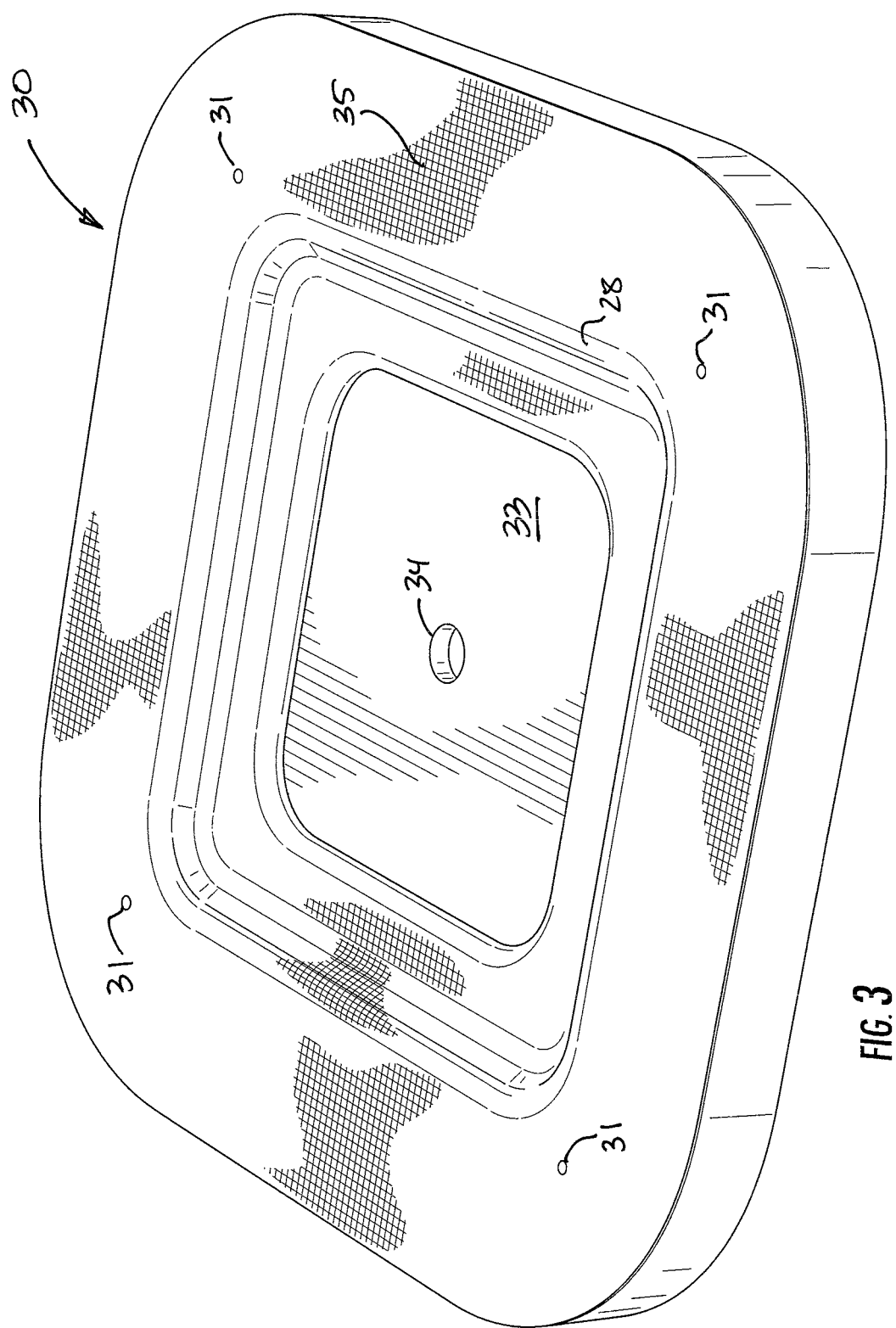
FIG. 3 is a perspective view of the fixture plate with the bottom face fabric positioned upon it.

FIG. 3 is a perspective view similar to FIG. 2, but illustrating the bottom face fabric 35 superimposed on the upper top surface 32 and the incline 28 of the fixture plate 30. In order to leave an opening for the eventual drain, the fabric does not need to cover most of the lower top surface 33 of the plate fixture 30. Alternatively, if the fabric covers the lower surface initially, the fabric can be trimmed later.

Figure 4:
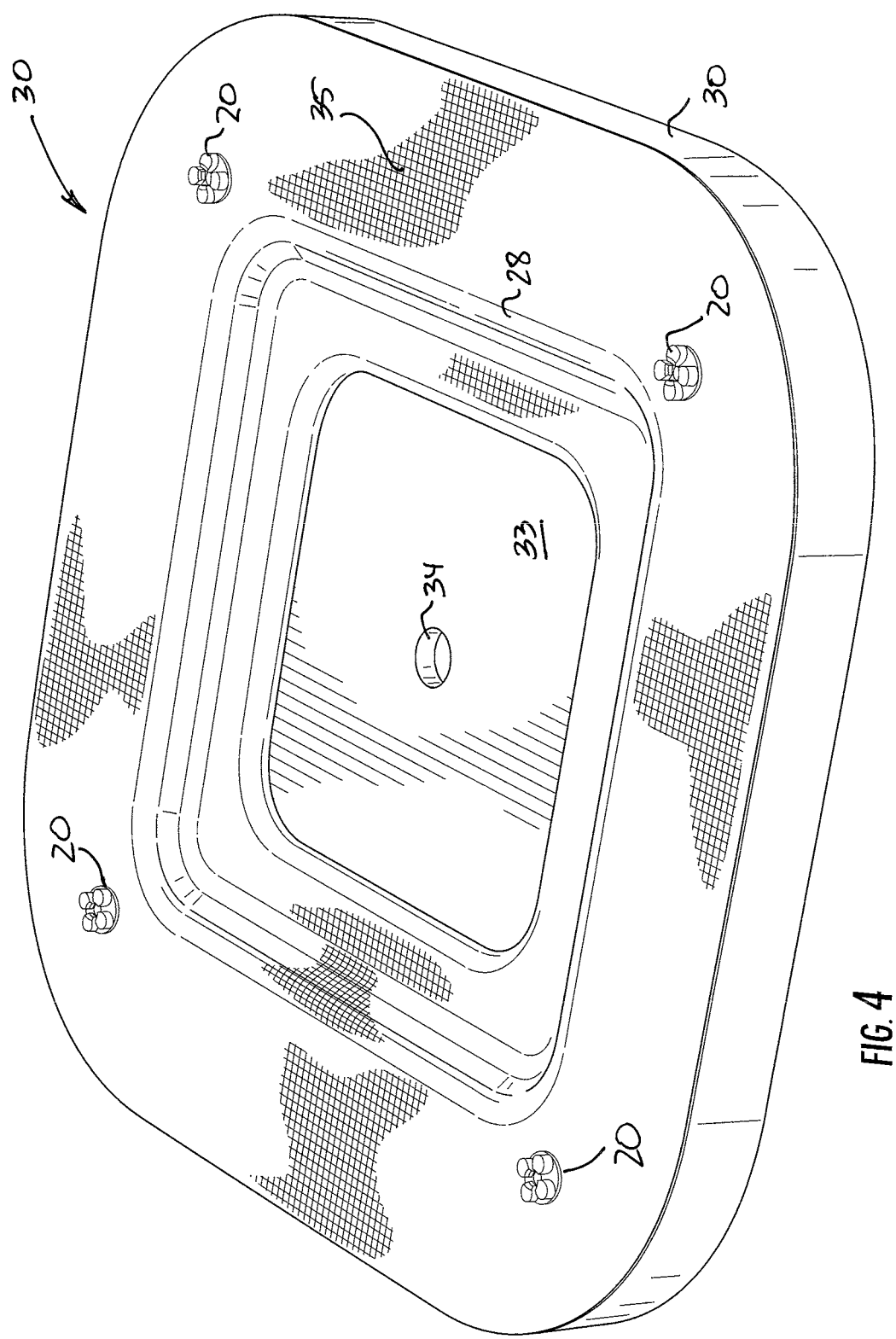
FIG. 4 is a perspective view of the fixture plate with the bottom face fabric and the gate button spacers.

FIG. 4 shows the fixture plate 30 in the next progressive step of the method in which the gate button spacers 20 have been inserted through the bottom face fabric 35 and into the corner positioning holes 31.

Figure 5:
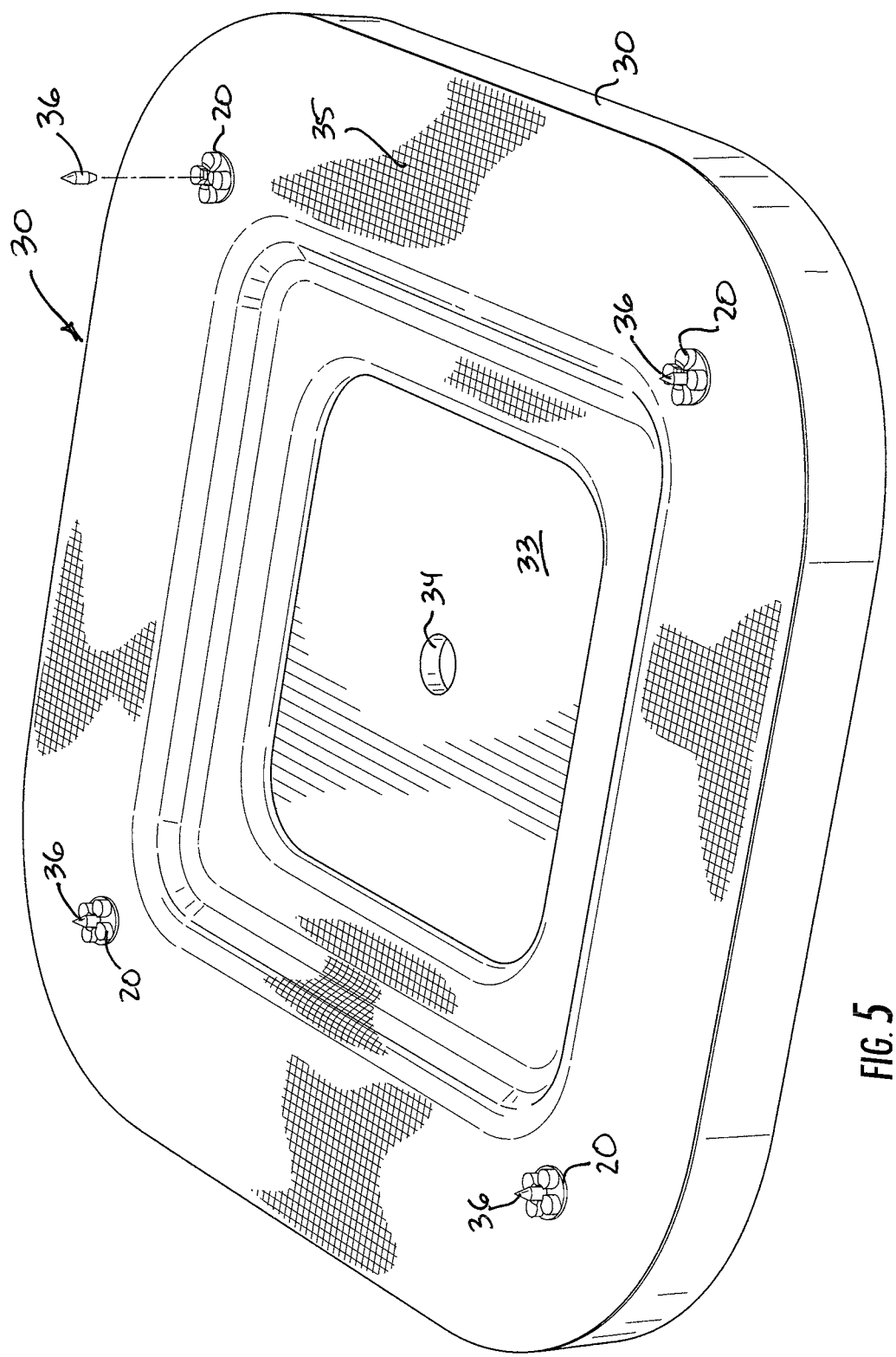
FIG. 5 is a perspective view of the fixture plate with the bottom face fabric and the gate along with the spacers and the alignment pins.

FIG. 5 is a view identical to FIG. 4 with the additional illustration of the alignment pins 36. The alignment pins 36 serve to position the top face fabric 37 in a desired orientation (FIG. 6).

Figure 6:
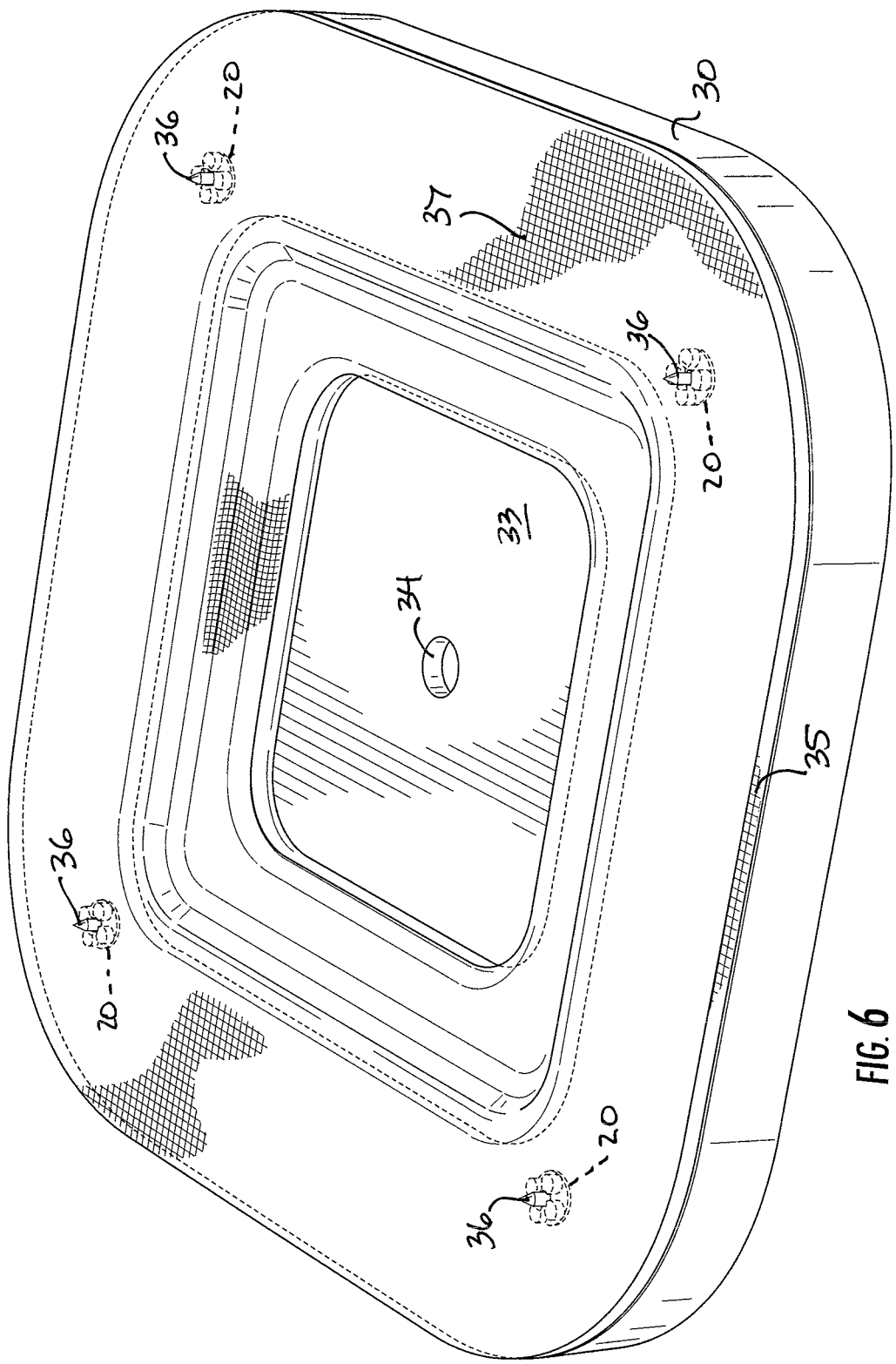
FIG. 6 is a perspective view of the fixture plate with the bottom face fabric, the gate spacer buttons, the alignment pins, and the top face fabric.

FIG. 6 is the next step in the progression of the method. FIG. 6 accordingly shows the fixture plate 30 in the same orientation as FIGS. 2-5, but also illustrates the top face fabric 37. As will be seen with respect to FIGS. 12-14, the top and bottom face fabrics 37, 35 are named based upon their eventual position in the finished flange. In the view of FIG. 6, the bottom face fabric 35 is positioned underneath and spaced apart from the top face fabric 37 by a distance defined by the spacing cylinders 22 of the gate button spacers 20. Additionally, the alignment pins help position the top face fabric 37 in the desired superimposed relationship over both the bottom face fabric 35 and the fixture plate 30.

Figure 7:
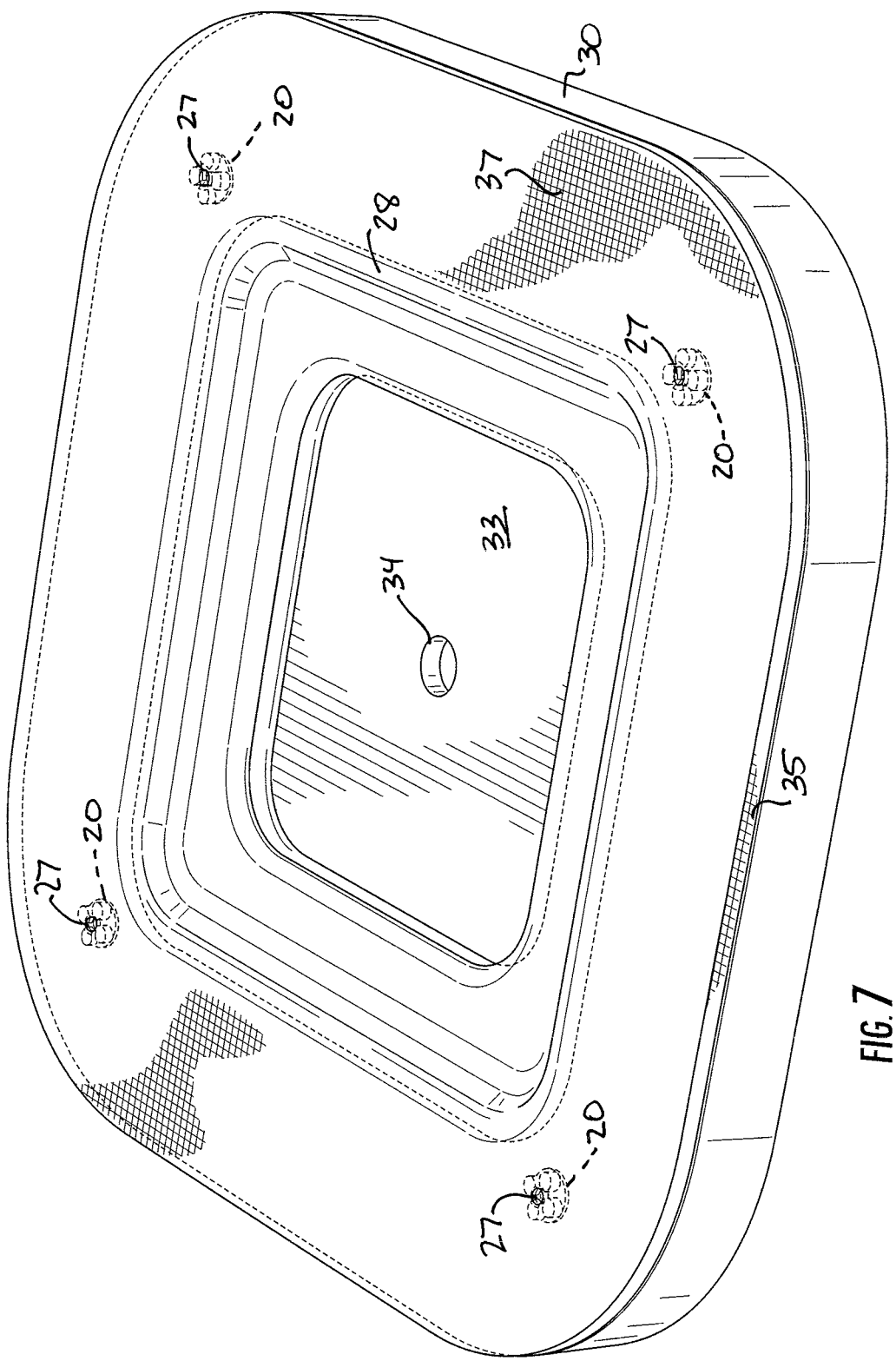
FIG. 7 is the same view as FIG. 6 but showing the alignment pins removed after the top face fabric is positioned.

FIG. 7 illustrates the next step in the progression of the method in which the alignment pins 36 have been removed. This, together with the exposed injection openings 27 in the respective gate button spacers 20 provide a path to the volume between the fabric sheets 35, 37 for the injected melted plastic (FIG. 12).

Figure 8:
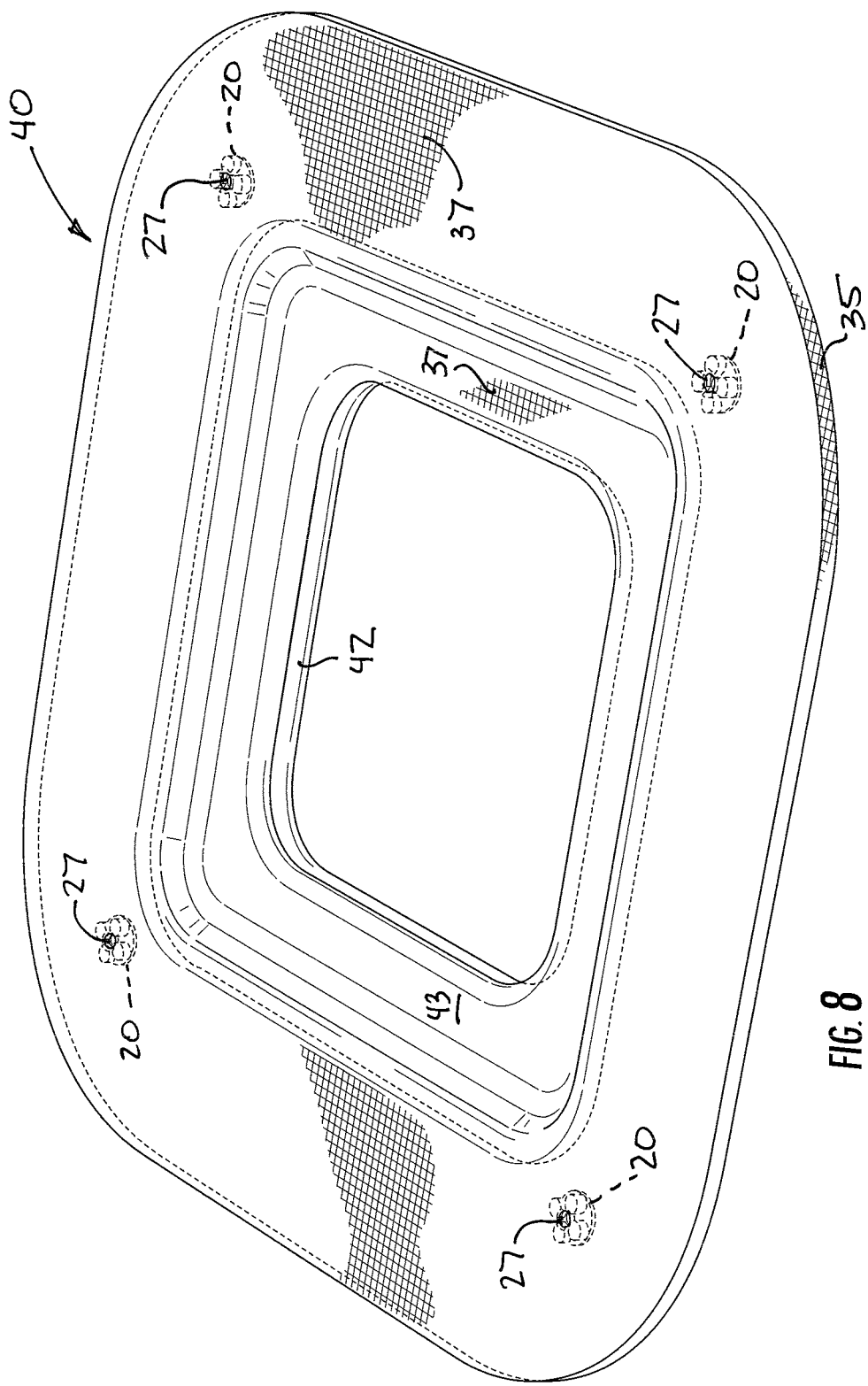
FIG. 8 is a perspective view of the completed fabric sandwich structure.

FIG. 8 illustrates the overlying relationship of the fabric layers 35, 37 with the combination being broadly designated at 40. The portion of the fixture plate that was not covered by fabric (e.g., FIGS. 3-7) defines a drain plate opening 42 surrounded by a drain perimeter 43. The gate spacer buttons 20 remain as a part of the illustrated combination.

Figure 9:
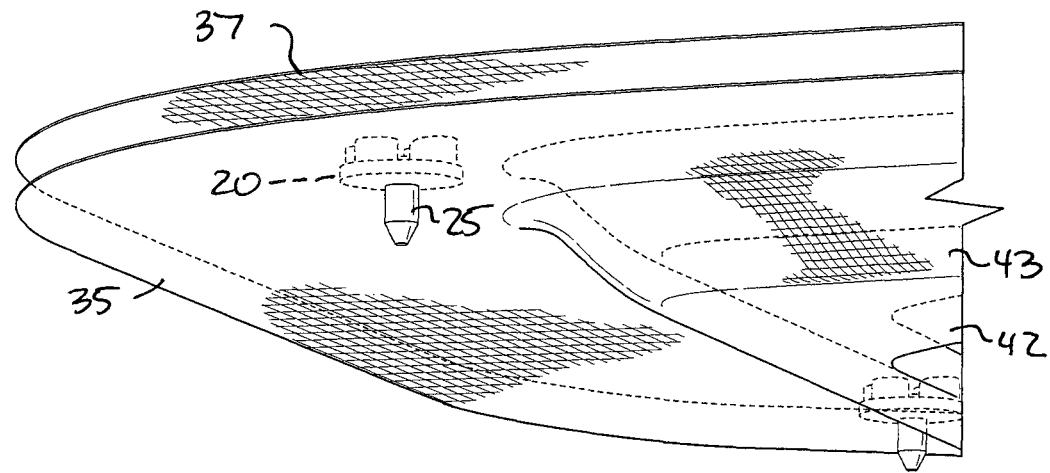
FIG. 9 is a partial perspective view of the top and bottom face fabric separated by the gate button spacer

FIG. 9 is a partial perspective view showing the relationship between and among the top face fabric 37, the bottom face fabric 35, the gate button spacers 20 and their pin cylinders 25, the stepped incline 28, the drain plate opening 42, and the drain perimeter 43.

FIG. 10 illustrates the same elements as FIG. 9, but in cross sectional orientation.

In the illustrated embodiment, the invention is shown as two fabric layers with one plastic layer in between. The gate spacer pins 20 are stackable in the manner illustrated in FIG. 11 so that fabric assemblies can be (optionally) stacked together prior to molding.

FIG. 12 is a partial perspective view illustrating in more detail the relationship between the top face fabric 37, the bottom face fabric 35, the gate spacer button 20 and the molded plastic 41. As FIG. 12 illustrates, the melted plastic resin for the core is injected into the opening 27 in the gate spacer 20 in the direction illustrated by the arrow 44. This permits the molten plastic to flow between the spacing cylinders 22 and then between the top and bottom face fabrics 37, 35. In general, sufficient molded plastic 41 is added to fill the entire volume between the fabric faces 35, 37 as defined by the fixture plate 30. Nevertheless, it will be understood that this is a step of efficiency and avoids waste rather than an absolute necessity. In some cases, it may be advantageous to inject slightly less resin 41 and trim excess fabric while in other cases it might be advantageous to inject surplus resin and trim it rather than the fabric.

The plastic core can be formed of any resin that has the appropriate structural strength (or can be molded to such strength and that does not otherwise adversely affect other materials in the overall structure (tile, mortar, membranes, etc.). Based upon the method, the resin for the core has a melting point lower than the melting point of the spacers 20 so that the spacers 20 maintain their structural integrity as the melted core resin is added. In exemplary embodiments, the core resin is selected from the group consisting of acrylic, nylon, polyethylene, polypropylene, polystyrene, polyvinyl chloride, PTFE, polyester, polycarbonate, polyurethane and acrylonitrile butadiene styrene ("ABS").

Figure 13:
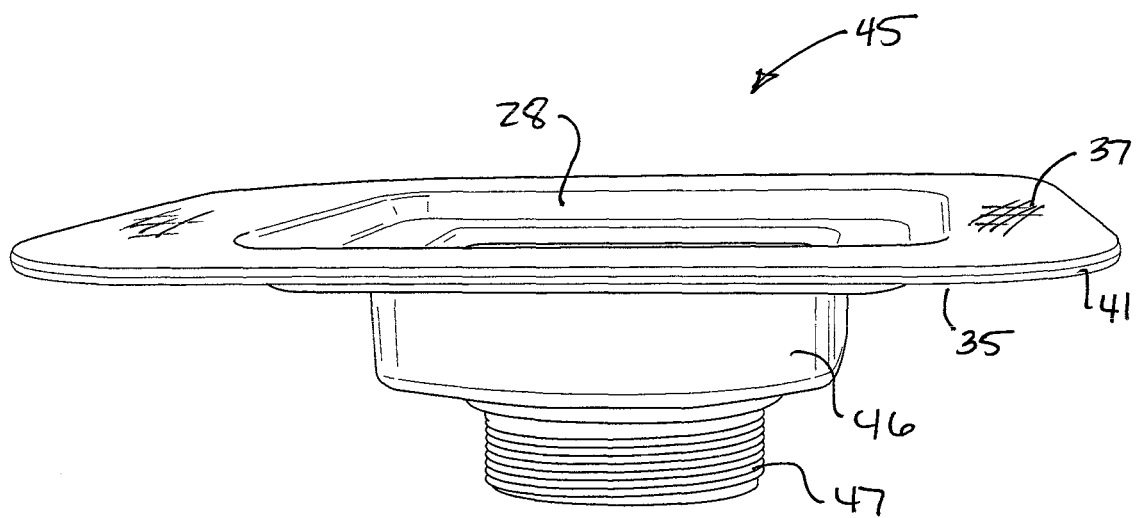
FIG. 13 is a perspective view of a finished flange.

FIG. 13 is a perspective view of a completed fixture broadly designated at 45. In the illustrated embodiment, the fixture 45 includes the top face fabric 37, the bottom face fabric 35, and the molded core 41. A pan 46 is molded to the drain opening 42 and includes a threaded nipple 47. The pan and nipple are exemplary rather than limiting, however, of the overall structure and method. A comparison of FIG. 13 with FIG. 10 illustrates that in most circumstances the pin 25 is removed (typically sheared or clipped) from the finished fixture.

Figure 14:
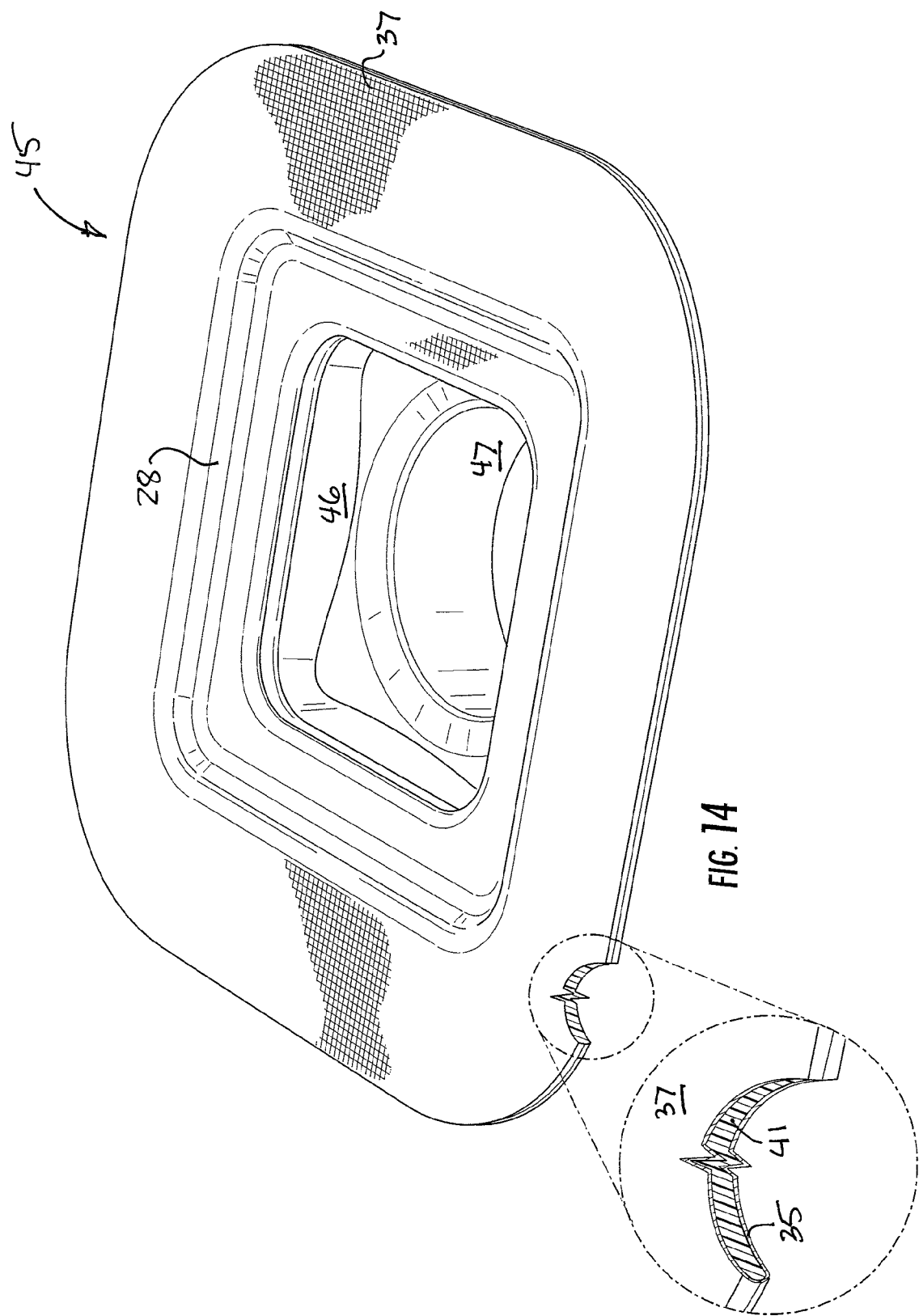
FIG. 14 is another perspective view of a finished flange and a cutaway portion illustrating the fabric sandwich.

FIG. 14 is a slightly different perspective view of these same elements with an enlarged cut out portion more clearly illustrating the top fabric surface 37, the bottom 35 and the core 41. FIG. 14 also shows the interior of the pan 46 and the interior of the threaded nipple 47.

The invention also includes a method of forming a drain fixture. In this aspect, the method includes the steps of positioning two aligned preformed fabrics on top of each other, with connecting elements positioned between the fabrics and bonded to each of the two fabrics in a mold and centering the connected fabrics inside the mold by means of the connecting elements, and injecting a plastic material through openings in the connecting elements to fill the space between the two fabrics with the plastic material.

In somewhat more detail, the invention includes the steps of superimposing a first temperature resistant fabric on a rigid temperature resistant fixture plate, positioning a temperature resistant spacer on the first fabric opposite the fixture plate, placing an alignment pin in the spacer on the fabric overlying the fixture plate, superimposing a second fabric over the first fabric and spaced from the first fabric by the spacer while aligning the second fabric on the alignment pin, removing the alignment pins and adding a melted polymer resin into the spacer, and through the spacer and between the fabrics while the fabrics and plate are clamped in a mold.

The relevant materials used in the method steps are, of course, those described with respect to FIGS. 1-14.

Figure 15:
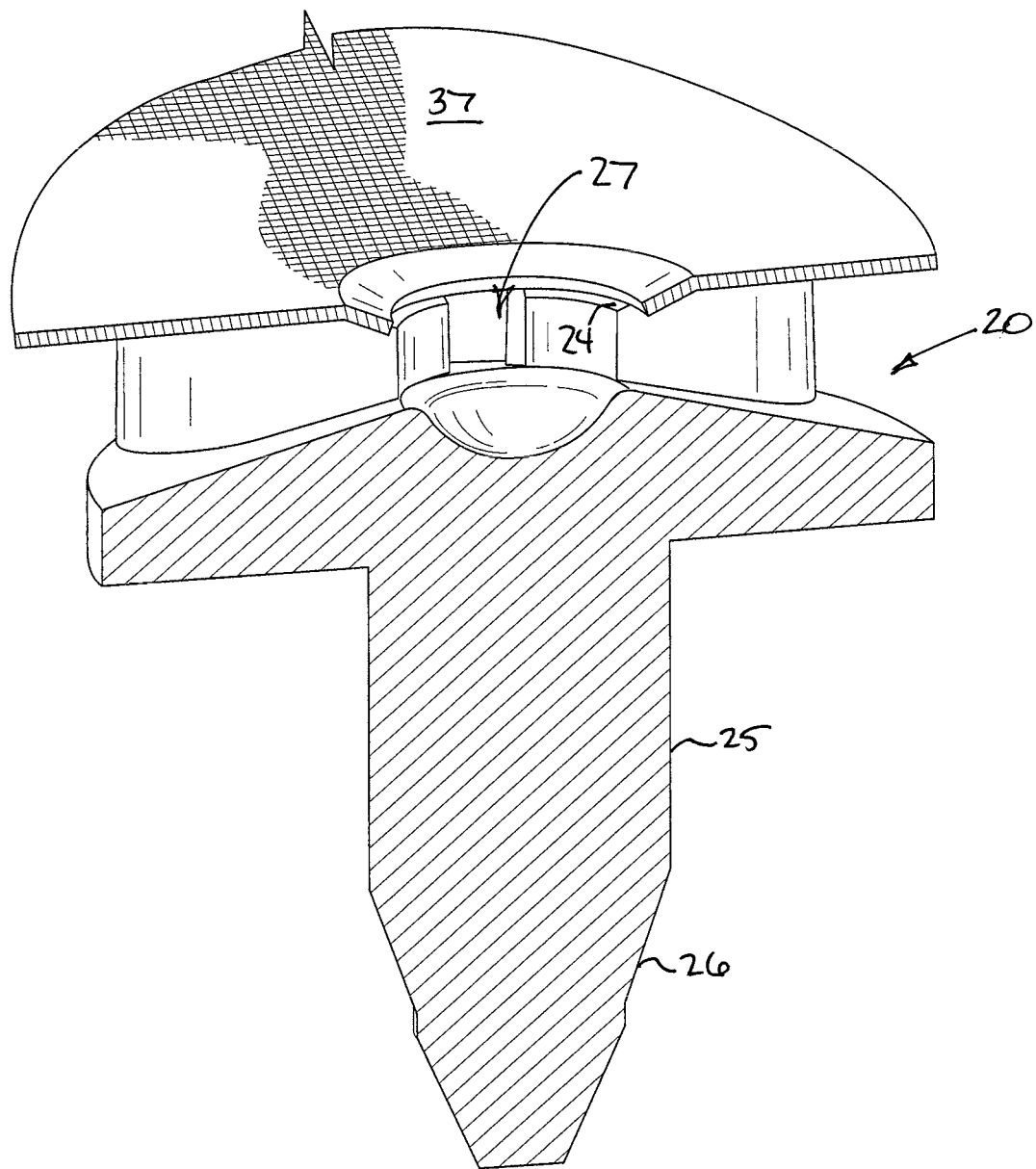
FIG. 15 is a cross sectional view of the gate button spacer and the top face fabric.

FIG. 15 is a cross-sectional view of the gate button spacer 20 in relationship to the top face fabric 37. In particular, FIG. 15 illustrates that the preformed fabric 37 covers the inclined edges 24 around the injection opening 27. This helps provide additional sealing in the mold so that when melted thermoplastic plastic is injected into the mold, the pressure that the plastic exerts will not dislodge the fabric and the fabric will remain sealed against the gate button spacer 20.

Figure 16:
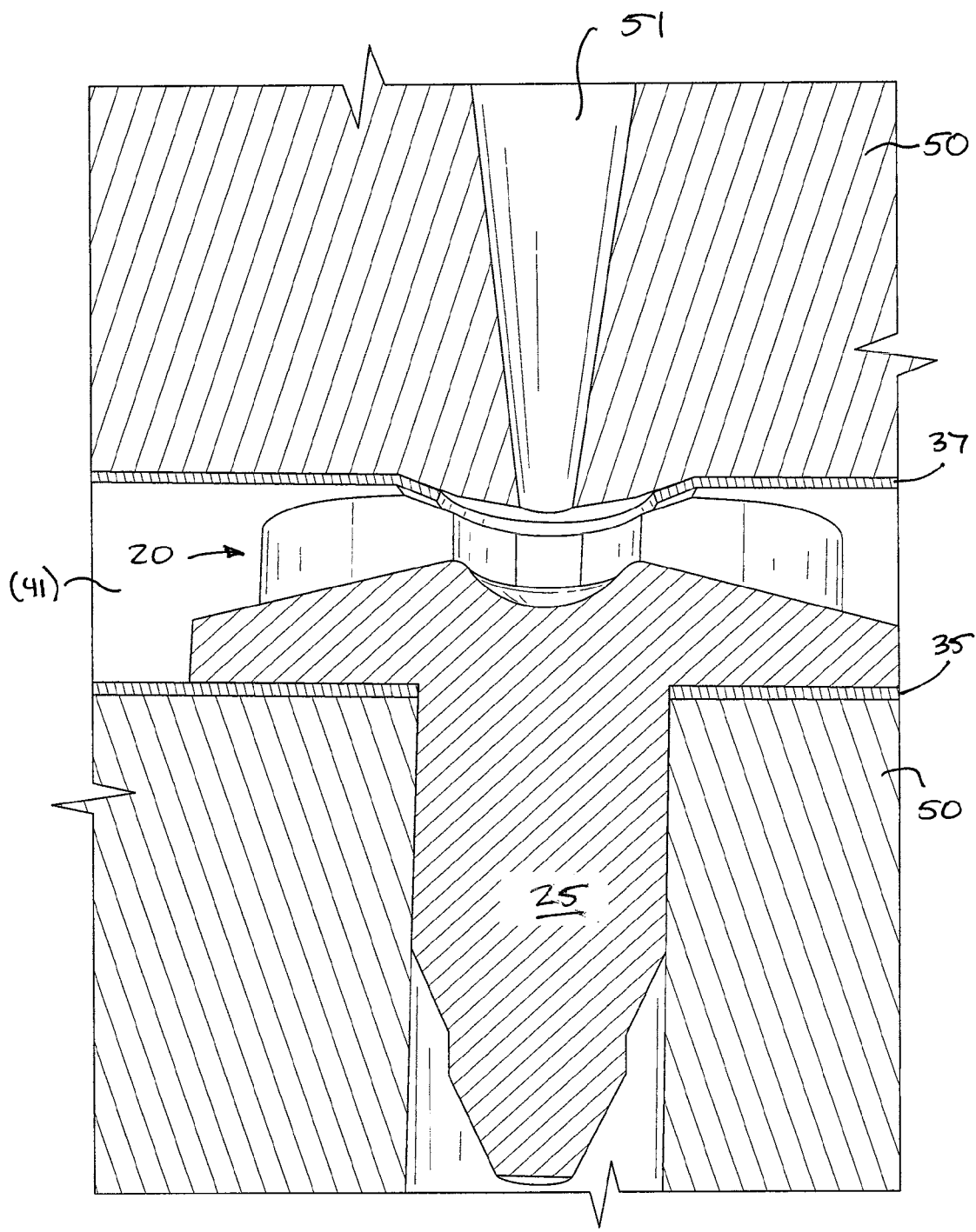
FIG. 16 is a cross sectional view of the gate button spacer and fabric in an injection mold.

FIG. 16 is another cross-sectional view illustrating the gate button spacer 20 in the mold 50. A feed opening 51 (also referred to as a "sprue") is positioned in alignment over the injection opening 27. After injection, the thermoplastic core 41 is positioned in the mold 50 between the bottom face fabric 35 and the top face fabric 37. FIG. 16 also illustrates that the pin 25 of the gate button spacer 20 is positioned in an appropriate opening 52 in the lower portion of the mold 50.

Figure 17:
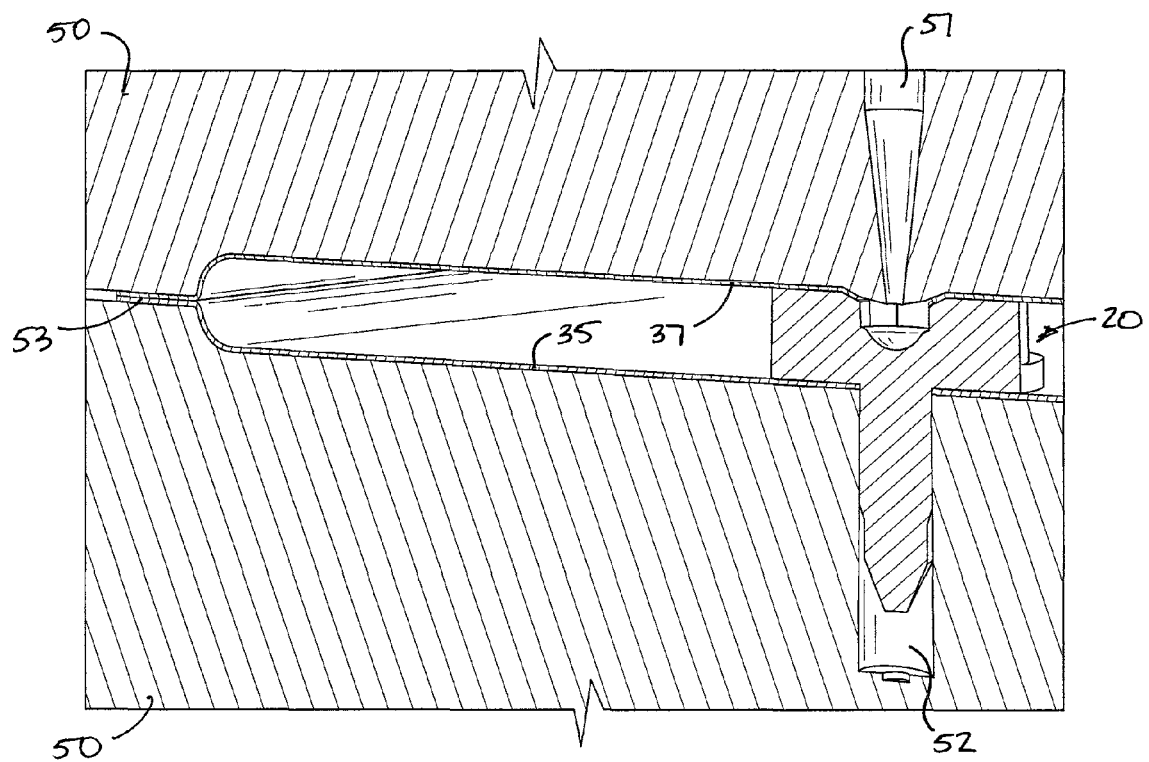
FIG. 17 is another cross sectional view of the gate button spacer and fabric in an injection mold.

FIG. 17 is a partial cross-sectional, partial perspective view of the fabric layers 35, 37 and the gates spacer in the context of the injection mold 50. Most of the elements illustrated in FIG. 17 are the same as those in FIG. 16, with the difference being that FIG. 17 illustrates that in exemplary embodiments, enough fabric is included to form a fabric lip 53 that extends laterally between the upper and lower portions of the mold 50. The fabric lip serves to enclose melted resin in the mold within the fabrics 35, 37, but also provides a channel through which gas can escape from the mold (while blocking melted plastic) as the liquid plastic is injected from the sprue 51 into the gate spacer button 20.

Although the invention has been described in terms of the double faced bonding flange for a shower drain, the method and resulting structural advantages are helpful for any plastic part that would normally not adhere well to mortar, but that is convenient in the mortar bond environment.

Figure 18:
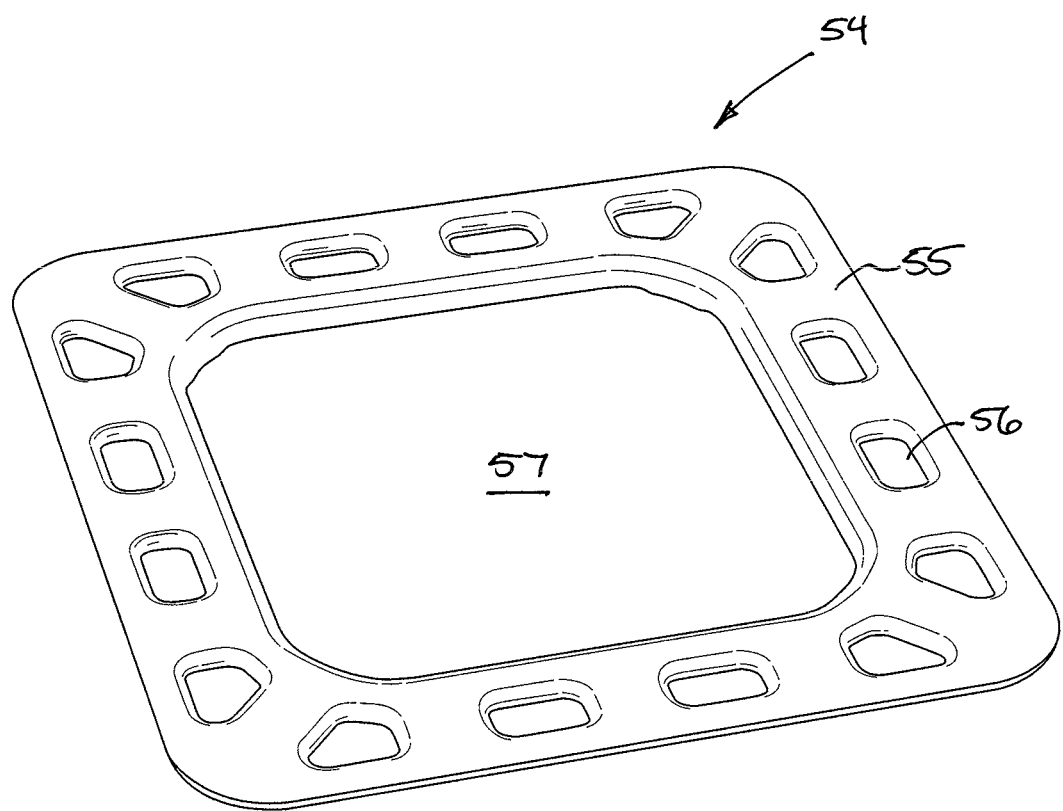
FIG. 18 is a perspective view of a drain alignment fixture.

Accordingly, FIG. 18 illustrates a drain alignment flange broadly designated at 54. Such an alignment flange is typically used near the drain opening to provide an aligned position for a drain grate. FIG. 18 shows a current conventional flange body 55 with a plurality of mortar openings 56.

The combination of the flange body 55 and the openings 56 define an overall drain opening 57.

Figure 19:
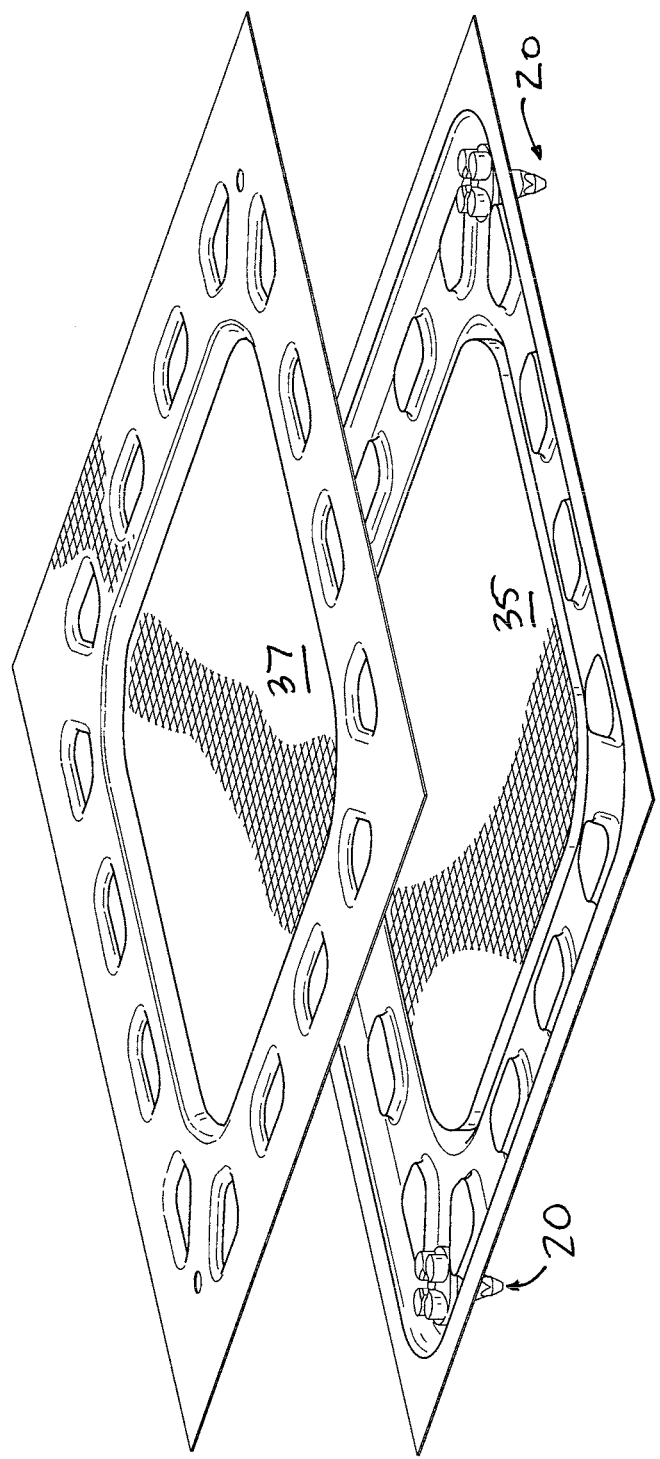
FIG. 19 is a perspective view of the fabric layers for the drain alignment fixture.

FIG. 19 illustrates a fabric sandwich entirely analogous to that illustrated in FIGS. 8-10, but in the form that will mold the drain alignment flange 54. Accordingly, the bottom face fabric 35 and the top face fabric 37 are both illustrated along with the gate button spacers 20.

As illustrated, the drain alignment flange 54 has a plurality of openings that permit mortar to set within and around the remainder of the structure, because otherwise the mortar tends not to adhere to the flange. Using the invention, however, the fabric present on both faces provides an advantageous improved adhesion to the thin set mortar. As a result, fewer openings are necessary, so that in turn the overall fixture is stronger.

Figure 20:
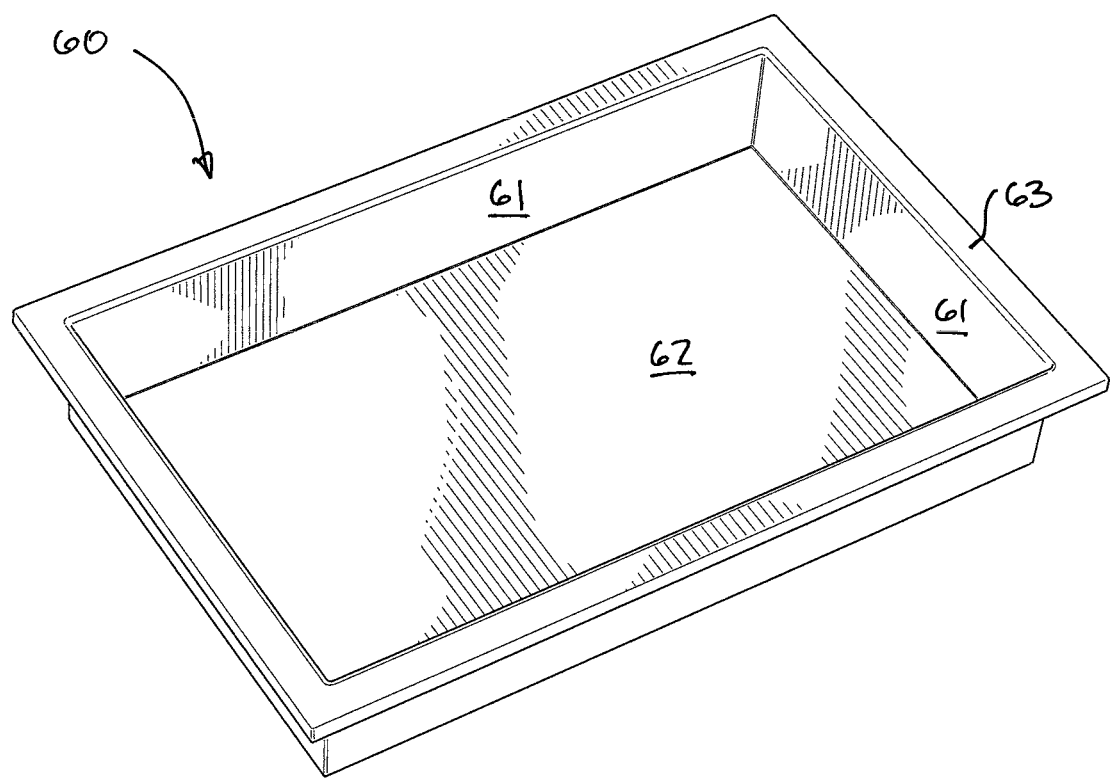
FIG. 20 is a perspective view of a niche fixture.
Figure 21:
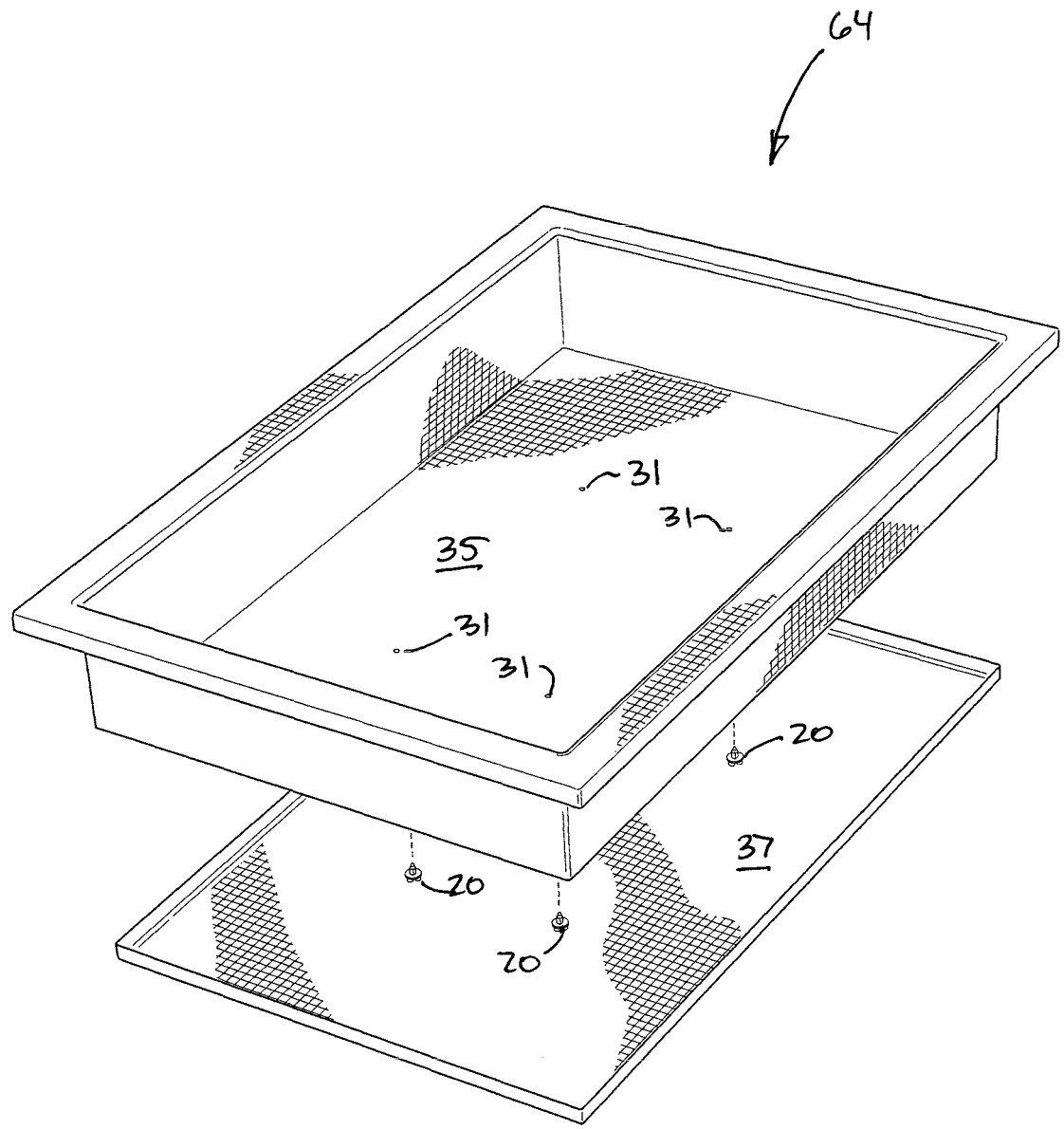
FIG. 21 is a perspective view of the fabric layers for the niche fixture.

FIGS. 20 and 21 are corresponding illustrations of a niche fixture broadly designated at 60. The niche fixture 60 is exemplary of the type used to provide an indented shelf or similar opening in a tile and mortar surface. The niche 60 can be covered with fabric on both sides in the same manner as the previously illustrated drain and flange fixtures. FIG. 20 illustrates that the niche fixture 60 includes a plurality of walls 61 and a floor 62. The illustrated embodiment is typical of niche fixtures that has a width that conveniently fits between normal 16 inch center on center stud construction. In a similar manner the depth of the niche fixture (i.e., the width of the walls) is typical of the depth available between walls in stud based construction. As illustrated, the niche fixture 60 includes a flange 63 to help secure it in position.

FIG. 21 illustrates the preformed fabric components for molding that form the "sandwich" broadly designated at 64. This is again formed of a lower fabric face 37, a top fabric face 35, the gate button spacers 20, and the positioning holes 31.

In the drawings and specification there has been set forth a preferred embodiment of the invention, and although specific terms have been employed, they are used in a generic and descriptive sense only and not for purposes of limitation, the scope of the invention being defined in the claims.

The invention claimed is:

1. A flanged plumbing fixture comprising a main fixture body with a planar flange projecting laterally therefrom, the flange having a rigid planar thermoplastic core layer having opposing outwardly facing planar surfaces with two planar fabric layers coextensive with the opposing planar surfaces of the thermoplastic core layer and fused respectively to the opposing planar surfaces each planar fabric layer being comprised of a plurality of textile fibers interengaged with each other in a textile structure defining interstices between the fibers, each planar fabric layer forming respective outwardly exposed faces of the fixture presenting an open three-dimensional mortar-bondable fabric structure suitable for interstitially receiving and bonding with a plumbing mortar.

2. A flanged plumbing fixture according to claim 1 wherein the main fixture body further comprises a depending pan beneath said flange; and a depending threaded nipple beneath said pan.

3. A flanged plumbing fixture according to claim 1 wherein each of said fabric layers is a nonwoven textile structure.

4. A flanged plumbing fixture according to claim 1 wherein said fibers of said fabric layers are selected from the group consisting of acrylic, nylon, polyethylene, polypropylene, polystyrene, polyvinyl chloride, PTFE, polyester, polycarbonate and polyurethane.

5. A flanged plumbing fixture according to claim 1 wherein said plastic core is selected from the group consisting of acrylic, nylon, polyethylene, polypropylene, polystyrene, polyvinyl chloride, PTFE, polyester, polycarbonate, polyurethane, and acrylonitrile butadiene styrene (ABS).

* * * * *